United States Patent Office 2,897,411
Patented July 28, 1959

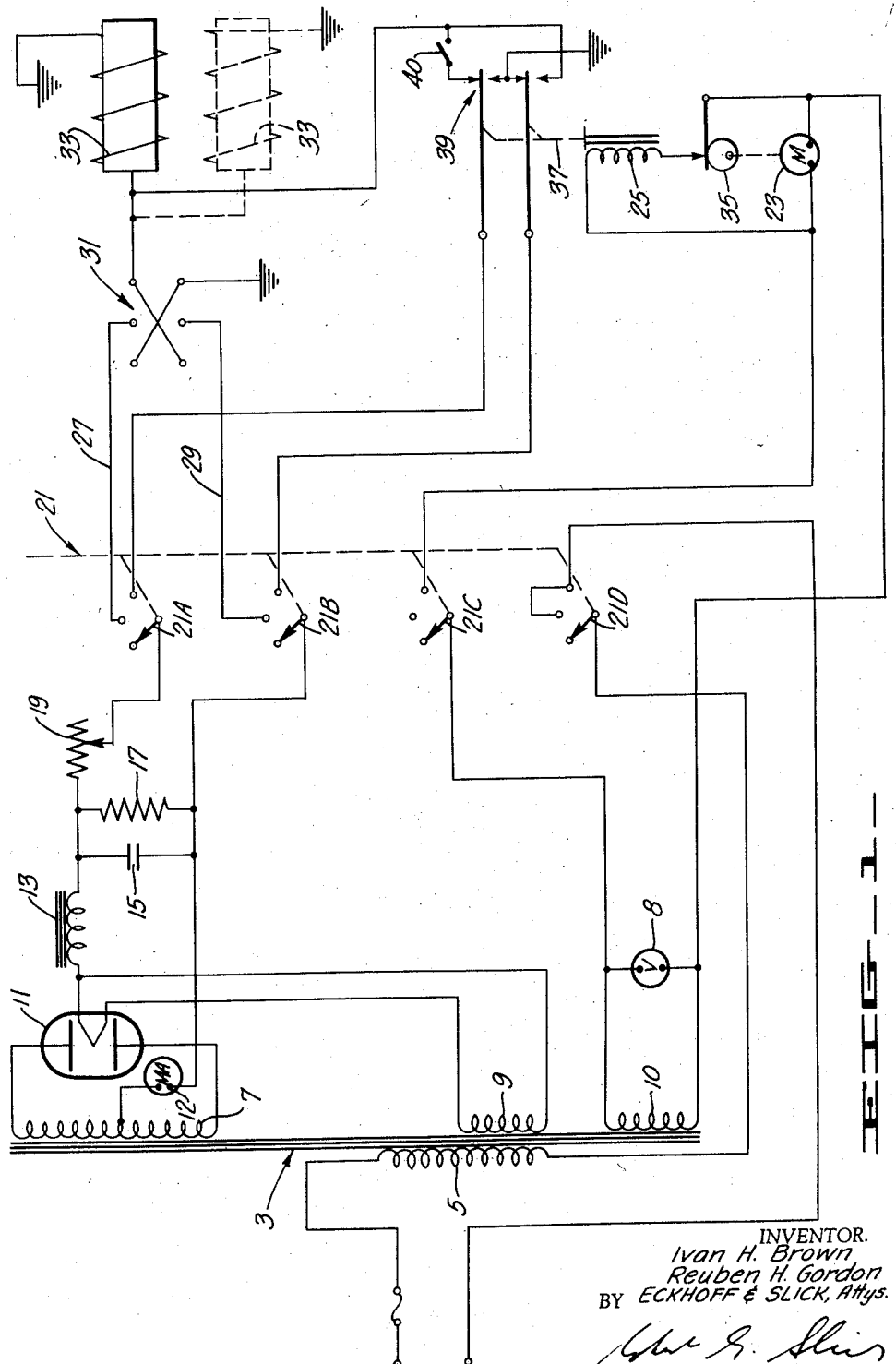

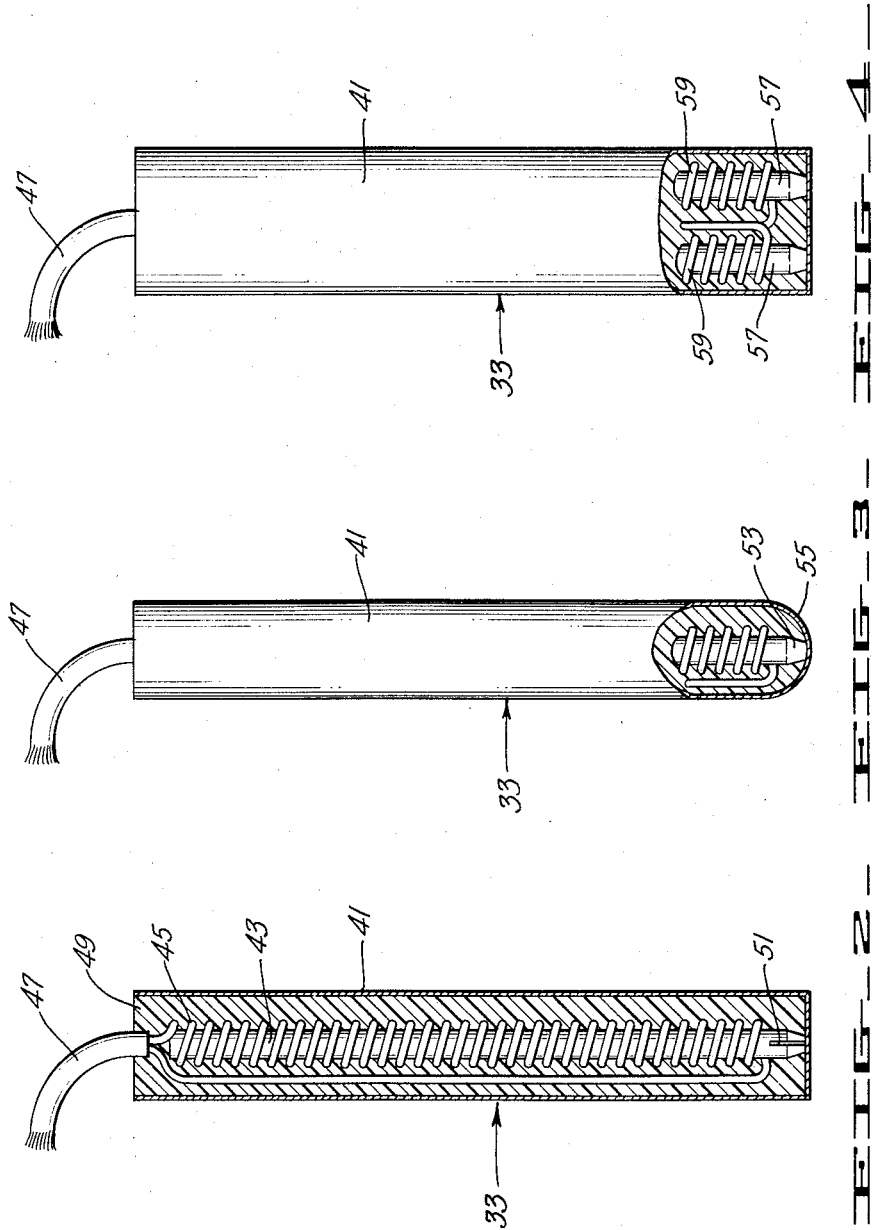

2,897,411

ELECTROMAGNET AND CONTROL CIRCUIT

Ivan H. Brown and Reuben H. Gordon, Vallejo, Calif., assignors to Gordon-Brown Company, Vallejo, Calif., a partnership Application August 17, 1956, Serial No. 604,653

1 Claim. (Cl. 317—123)

This invention relates to certain novel electromagnets and to novel control circuits therefor. Although the novel electromagnets of the present invention are primarily designed for use in treatment of the human body, they can be employed in any manner wherein it is desired to use magnets.

It is an object of the present invention to provide a novel type of magnet wherein the magnet is encased in a protecting sheath and wherein there is substantially no danger of receiving a shock from the electromagnet.

Another object of this invention is to provide a magnet structure encased in a sheath so that the magnet may be inserted in various openings of the body.

Still another object of this invention is to provide a magnet control circuit wherein one end of the magnet may be given a certain polarity at will, the polarity reversed either manually or automatically, or wherein the magnet may be pulsed. By "automatically" is meant by means which periodically reverse or pulse the current supplying the magnet.

Referring to the drawings by reference characters, there is shown in Figure 1 a schematic diagram of the power and control circuit of the present invention. The circuit has a power transformer, generally designated 3, having a conventional primary winding 5 thereon, and three secondary windings, namely, a high voltage, center tapped winding 7, a low voltage rectifier filament winding 9, and a second low voltage winding 10. If desired, the voltage of winding 10 may be measured by voltmeter 8. The high voltage winding 7 is connected to the plates of a conventional full wave rectifier tube 11, such as a type 80, while the winding 9 is connected to the filament thereof. The output of the rectifier tube is taken off through a choke input filter comprising a filter choke 13 and a filter condenser 15. A bleeder resistor 17 is used to prevent the voltage from soaring to undesirably high values during switching operations. A variable series resistor 19 may be used to regulate the current flow and a milliammeter 12 is provided to indicate the current flow. The output from the filter system is connected to two poles of a four pole three throw switch, which has been generally designated 21. The four pole switch has three positions, the left position being off, the center position being manual and the third position being automatic. The switch sections 21A and 21B serve to switch the high voltage between the manual and automatic controls. The switch section 21C is used to energize a motor 23 and a relay 25 from the winding 10, while the switch section 21D serves as an off-on switch for the primary circuit. When the switch 21 is in the center position, current flows through the wires 27 and 29 to the center poles of the double pole, double throw switch 31. By means of the switch 31, the current may be caused to pass through the windings of the electromagnets 33 at will in either direction, by an appropriate change in the position of the switch.

In some operations, it is desirable to have the current in the magnets reversed in polarity at a relatively slow cyclic rate of, say, 18 to 25 times per minute. When this is desired, switch 21 is placed in the farthest right position, which starts the slow speed motor 23, which turns the eccentric 35, which periodically makes and breaks the circuit through the coil of the relay 25. The armature of the relay 37 actuates the double pole, double throw switch contact of the relay, designated 39, so that the periodical reversal effect is achieved. If one desires pulsating current, the switch 40 is opened.

Turning now to Figures 2 through 4, there is shown a series of electromagnets suitable for use with the circuit thus described. In Figure 2, there is shown an electromagnet having a case 41 of brass or other suitable nonmagnetic material, carrying therein a core 43 of a paramagnetic material, which may or may not be laminated. A solenoid 45 goes around the core 43 in the conventional manner and is attached to the power unit by means of suitable wiring 47. Preferably, the electromagnet is potted by filling the case with a plastic material 49.

In the embodiment shown in Figure 2, the end of the core 43 has been slotted as at 51. This produces an effect of two poles of like polarity, separated a short distance from each other.

In the embodiment shown in Figure 3, a similar structure is employed except the core 43 is merely tapered at the end, as at 53. In addition, in the embodiment shown in Figure 3, the end of the case is gently rounded, as at 55, so that the device may be readily slipped into a body cavity.

In the embodiment shown in Figure 4, two cores 57 are employed, each of which has a solenoid 59 thereon. The two solenoids are connected in parallel and the windings are in the same direction so that both of the cores are given the same polarity.

It is believed apparent from the above description that we have provided a simple and effective series of electromagnets with a convenient control circuit therefor so that the magnets may be operated at a constant polarity, the polarity may be reversed, either manually or automatically, or the magnets may be pulsed periodically.

We claim:

An electromagnet comprising: an elongated case of a nonmagnetic material; at least one paramagnetic core within said case substantially coextensive with said case; a solenoid surrounding said core and substantially coextensive therewith; said core having a tip positioned adjacent one end of said nonmagnetic case, the tip of said core adjacent said nonmagnetic case being slotted to provide two poles of the same polarity spaced a short distance from each other; an inert plastic material filling the space between said core and said case; means for supplying high voltage direct current electricity to said electromagnet; and control means positioned between said source of direct current electricity and said electromagnet, said control means comprising a first switch whereby said current may be conducted to a first circuit or a second circuit, said first circuit having a reversing switch therein whereby the current may manually be caused to flow in either direction, said second circuit having in association therewith a double pole, double throw reversing switch and automatic means whereby said switch is reversed at a slow cyclic rate and an auxiliary switch leading from said double pole, double throw switch whereby one side of the line may be interrupted to give a pulsing flow of unidirectional current.

References Cited in the file of this patent

UNITED STATES PATENTS

| | | |
|---|---|---|
| 651,777 | Brown | June 12, 1900 |
| 1,033,883 | Fette | July 30, 1912 |
| 1,558,447 | Beach | Oct. 20, 1925 |
| 1,908,688 | Call | May 16, 1933 |
| 2,436,538 | Wing | Feb. 24, 1948 |